US009521000B1

(12) United States Patent
Roth et al.

(10) Patent No.: US 9,521,000 B1
(45) Date of Patent: Dec. 13, 2016

(54) COMPLETE FORWARD ACCESS SESSIONS

(71) Applicant: Amazon Technologies, Inc., Reno, NV (US)

(72) Inventors: Gregory Branchek Roth, Seattle, WA (US); Graeme David Baer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 402 days.

(21) Appl. No.: 13/944,579

(22) Filed: Jul. 17, 2013

(51) Int. Cl.
*H04L 9/32* (2006.01)

(52) U.S. Cl.
CPC .................................. *H04L 9/3247* (2013.01)

(58) Field of Classification Search
CPC .................................................... H04L 9/3247
USPC .......................................................... 713/176
See application file for complete search history.

(56) References Cited

U.S. PATENT DOCUMENTS

| | | | |
|---|---|---|---|
| 5,179,591 | A | 1/1993 | Hardy et al. |
| 5,200,999 | A | 4/1993 | Matyas et al. |
| 5,497,421 | A | 3/1996 | Kaufman et al. |
| 6,084,969 | A | 7/2000 | Wright et al. |
| 6,097,817 | A | 8/2000 | Bilgic et al. |
| 6,185,316 | B1 | 2/2001 | Buffam |
| 6,453,416 | B1 | 9/2002 | Epstein |
| 6,826,686 | B1 | 11/2004 | Peyravian et al. |
| 6,851,054 | B2 | 2/2005 | Wheeler et al. |
| 6,957,393 | B2 | 10/2005 | Fano et al. |
| 6,959,394 | B1 | 10/2005 | Brickell et al. |
| 6,985,583 | B1 | 1/2006 | Brainard et al. |
| 7,010,689 | B1 | 3/2006 | Matyas et al. |
| 7,073,195 | B2 | 7/2006 | Brickell et al. |
| 7,139,917 | B2 | 11/2006 | Jablon |
| 7,228,417 | B2 | 6/2007 | Roskind |
| 7,320,076 | B2 | 1/2008 | Caronni |
| 7,512,965 | B1 | 3/2009 | Amdur et al. |
| 7,685,430 | B1 | 3/2010 | Masurkar |
| 7,721,322 | B2 | 5/2010 | Sastry et al. |
| 7,757,271 | B2 | 7/2010 | Amdur et al. |

(Continued)

FOREIGN PATENT DOCUMENTS

| | | |
|---|---|---|
| WO | WO2006077822 | 7/2006 |
| WO | WO2008024705 | 2/2008 |
| WO | WO2014063661 | 5/2014 |

OTHER PUBLICATIONS

Amazon, "Amazon Prime Video—security considerations," Amazon.com General Help Forum, http://www.amazon.com/gp/help/customer/forums?ie=UTF8&cdForum=Fx2NFGOONPZEXIP&cdPage=1&cdSort=newest&cdThread=Tx18VZVGGUOY32, latest reply Jun. 17, 2013, 3 pages.

(Continued)

*Primary Examiner* — Jacob Lipman
(74) *Attorney, Agent, or Firm* — Davis Wright Tremaine LLP

(57) ABSTRACT

A service provider manages access control to multiple services through an authentication system. One or more services are able to fulfill requests at least in part by submitting requests to other services of the service provider. Such a service is able to obtain, from the authentication system, information that can be passed on to one or more other services to enable the one or more other services to determine request validity without having to contact the authentication system. The information may include, for example, one or more responses that the one or more other services would have received had the one or more services contacted the authentication system themselves.

24 Claims, 11 Drawing Sheets

(56) References Cited

U.S. PATENT DOCUMENTS

| | | |
|---|---|---|
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van der Horst et al. |
| 8,275,356 B2 | 9/2012 | Hickie |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth |
| 8,745,205 B2 | 6/2014 | Anderson et al. |
| 8,776,190 B1 | 7/2014 | Cavage et al. |
| 8,776,204 B2 | 7/2014 | Faynberg et al. |
| 8,868,923 B1 | 10/2014 | Hamlet et al. |
| 8,892,865 B1 | 11/2014 | Roth |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0135740 A1 | 7/2003 | Talmor et al. |
| 2003/0145197 A1 | 7/2003 | Lee et al. |
| 2003/0149781 A1 | 8/2003 | Yared et al. |
| 2003/0188117 A1 | 10/2003 | Yoshino et al. |
| 2004/0088260 A1 | 5/2004 | Foster et al. |
| 2004/0103096 A1 | 5/2004 | Larsen |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0172535 A1 | 9/2004 | Jakobsson et al. |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 | 12/2005 | Hyndman et al. |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Walczak, Jr. et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0040773 A1 | 2/2008 | AlBadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0172793 A1 | 7/2009 | Newstadt et al. |
| 2009/0210712 A1 | 8/2009 | Fort |
| 2009/0217385 A1 | 8/2009 | Teow et al. |
| 2009/0254572 A1 | 10/2009 | Redlich et al. |
| 2009/0320093 A1 | 12/2009 | Glazier et al. |
| 2010/0017603 A1 | 1/2010 | Jones |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 | 3/2010 | Cheng |
| 2010/0083001 A1 | 4/2010 | Shah et al. |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0332845 A1 | 12/2010 | Asaka |
| 2011/0004753 A1 | 1/2011 | Gomi et al. |
| 2011/0010538 A1 | 1/2011 | Falk |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0099362 A1 | 4/2011 | Haga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0265172 A1 | 10/2011 | Sharma et al. |
| 2011/0296497 A1 | 12/2011 | Becker |
| 2011/0311055 A1 | 12/2011 | Parann-Nissany |
| 2011/0320606 A1 | 12/2011 | Madduri et al. |
| 2012/0017095 A1 | 1/2012 | Blenkhorn et al. |
| 2012/0020474 A1 | 1/2012 | Kudoh et al. |
| 2012/0023334 A1 | 1/2012 | Brickell et al. |
| 2012/0036551 A1 | 2/2012 | Le Saint et al. |
| 2012/0054625 A1 | 3/2012 | Pugh et al. |

(56) References Cited

U.S. PATENT DOCUMENTS

| | | |
|---|---|---|
| 2012/0060035 A1 | 3/2012 | Kalmady et al. |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0159577 A1 | 6/2012 | Belinkiy et al. |
| 2012/0233216 A1 | 9/2012 | Lim |
| 2012/0243687 A1 | 9/2012 | Li |
| 2012/0245978 A1 | 9/2012 | Jain |
| 2012/0265690 A1 | 10/2012 | Bishop et al. |
| 2012/0317414 A1 | 12/2012 | Glover |
| 2013/0031255 A1 | 1/2013 | Maloy et al. |
| 2013/0086662 A1 | 4/2013 | Roth |
| 2013/0086663 A1 | 4/2013 | Roth et al. |
| 2013/0111217 A1 | 5/2013 | Kopasz et al. |
| 2013/0132232 A1 | 5/2013 | Pestoni et al. |
| 2013/0145447 A1 | 6/2013 | Maron |
| 2013/0166918 A1 | 6/2013 | Shahbazi et al. |
| 2013/0191884 A1 | 7/2013 | Leicher et al. |
| 2013/0198519 A1 | 8/2013 | Marien |
| 2013/0254536 A1 | 9/2013 | Glover |
| 2013/0282461 A1 | 10/2013 | Ovick et al. |
| 2013/0318630 A1 | 11/2013 | Lam |
| 2014/0013409 A1 | 1/2014 | Halageri |
| 2014/0082715 A1 | 3/2014 | Grajek et al. |
| 2014/0122866 A1 | 5/2014 | Haeger et al. |
| 2014/0181925 A1 | 6/2014 | Smith |
| 2014/0208408 A1 | 7/2014 | Bilgen et al. |
| 2014/0281477 A1 | 9/2014 | Nayshtut et al. |
| 2014/0281487 A1 | 9/2014 | Klausen et al. |
| 2015/0082039 A1 | 3/2015 | Stalzer et al. |
| 2015/0089614 A1 | 3/2015 | Mathew et al. |

OTHER PUBLICATIONS

Berners-Lee et al., "Uniform Resource Identifier (URI): Generic Syntax," Network Working Group Request for Comments: 3986, The Internet Society 2005 retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion mailed Dec. 30, 2014 in International Patent Application No. PCT/US2014/057043, filed Sep. 23, 2014.

International Search Report and Written Opinion mailed Dec. 30, 2014 in International Patent Application No. PCT/US2014/057051, filed Sep. 23, 2014.

International Search Report and Written Opinion mailed Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 System Administrator's Guide [online]," May 2012 retrieved Jun. 27, 2012, from http://web.mit.edu/kerberos/krb5-1.10/krb5-1.10.2/doc/krb5-admin.html, 57 pages.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 UNIX User's Guide," dated May 2012, retrieved on Jun. 28, 2012, from http://web.mit.edu/kerberos/krb5-1.10/krb5-1.10.2/doc/krb5-user.html, 38 pages.

Patent Cooperation Treaty, "Notification of Transmittal of the International Search Report and the Written Opinion of the International Searching Authority, or the Declaration," issued to International Application No. PCT/US/058083 on Dec. 27, 2012.

Roth et al.,"Hierarchical Data Access Techniques," U.S. Appl. No. 13/431,882, filed Mar. 27, 2012.

Simpson, "PPP Challenge Handshake Authentication Protocol (CHAP)," Network Working Group, Aug. 1996, retrieved from Internet Jun. 27, 2012, https://tools.ietf.org/html/rfc1994, 13 pages.

U.S. Appl. No. 13/431,760, filed Mar. 27, 2012.

U.S. Appl. No. 13/431,898, filed Mar. 27, 2012.

Wang et al., "Extending the Security Assertion Markup Language to Support Delegation for Web Services and Grid Services," IEEE International Conference on Web Services 1:67-74, Jul. 11-15, 2005.

Wikipedia, "Physical unclonable function," retrieved Aug. 22, 2013, from http://en.wikipedia.org/wiki/Physical_unclonable_function, 8 pages.

TCG Published, "TPM Main Part 1 Design Principles," Specification Version 1.2, Revision 116, Mar. 1, 2011, 184 pages.

TCG Published, "TPM Main Part 2 TPM Structures," Specification Version 1.2, Level 2 Revision 116, Mar. 1, 2011, 202 pages.

TCG Published, "TPM Main Part 3 Commands," Specification Version 1.2, Level 2 Revision 116, Mar. 1, 2011, 339 pages.

COMPLETE FORWARD ACCESS SESSIONS

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

BRIEF DESCRIPTION OF THE DRAWINGS

Various embodiments in accordance with the present disclosure will be described with reference to the drawings, in which.

DETAILED DESCRIPTION

Figure 1:
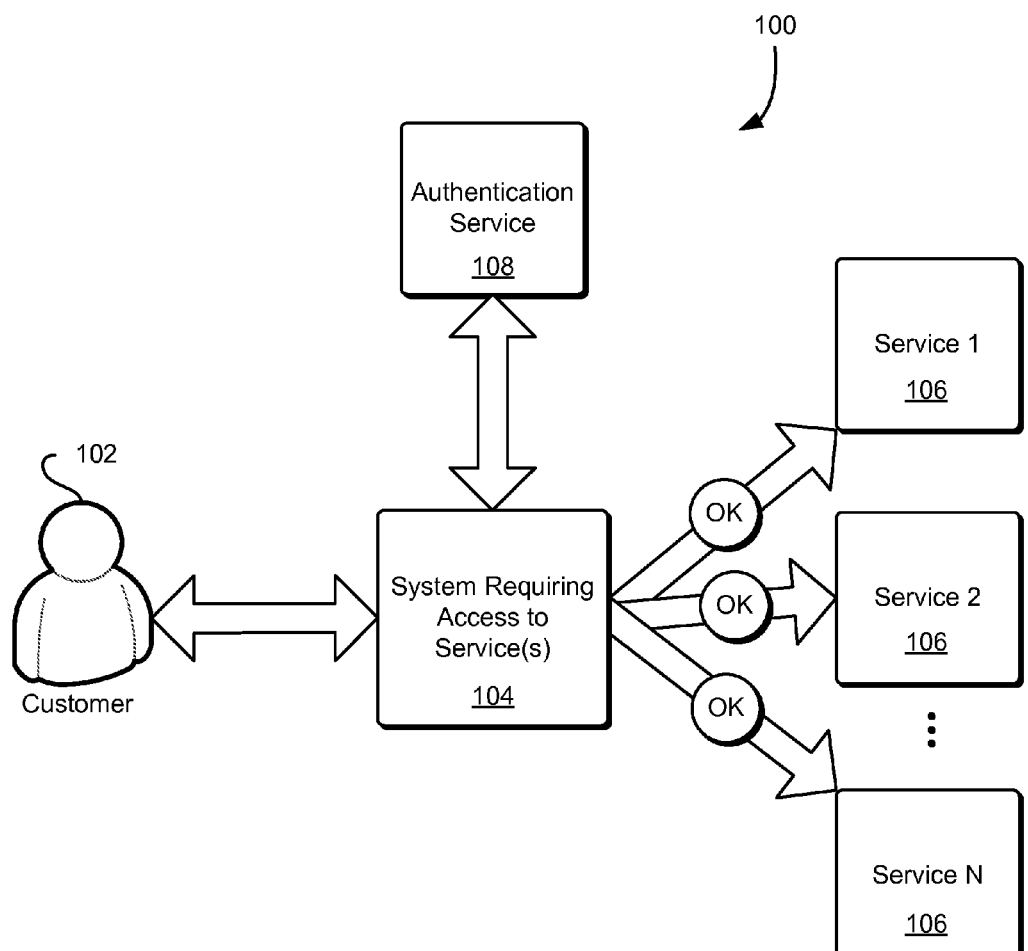
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for managing access to resources, such as computing resources hosted by a computing resource service provider. In some examples, a service provider operates a plurality of services that are accessible to customers of the service provider. Access to the services may require utilization of various techniques for controlling access to resources so that only authorized access is allowed. Such techniques may include the use of electronic signatures or other mechanisms to enable proof of identity as a part of requesting resource access. To enable customers of the service provider to utilize multiple offered services, the service provider may utilize a centralized authentication system (also referred to as an authentication service) that is configured within the system of the service provider as a whole to have authority with respect to access to the various services. For instance, in some embodiments, the various services may receive electronically signed requests and utilize the authentication service to verify the electronic signatures and, therefore, use verification of the electronic signatures to determine whether to fulfill the requests.

In various embodiments, multiple services of the service provider operate in concert. For instance, a request to one service may be fulfillable, at least in part, by the performance of one or more operations by another service. As an illustrative example, one service may involve the management and coordination of one or more other services. When the service receives a request from a customer (customer request), the service may itself cause one or more other services to perform one or more operations to fulfill the requests. The service may itself, for instance, submit its own requests (service requests) to the other service(s) as a result of receiving a customer request. As another example, the service may provide a management console that provides (e.g., as web pages) a convenient graphical user interface to assist customers in configuring computing resources using the various services of the service provider. In other examples, a service may submit requests to other services independent of a pending customer request. For instance, a service may operate in accordance with a timer, triggers, and/or otherwise independently of a pending customer request. As an illustrative example, a service may provide automatic scaling functionality. Upon the detection of one or more triggers (system load of a remotely hosted customer system relative to capacity, e.g.), the service may submit one or more requests to another service to increase or decrease capacity (or some other aspect of computing resources, such as bandwidth), as appropriate.

In various embodiments of the present disclosure, techniques described and suggested herein provide for the collective operation of multiple services in furtherance of a goal with a lightened load on an authentication system. For instance, in some examples, one service may provide to another service information that enables determination of whether a request should be fulfilled without direct communication with the authentication service. In some embodiments, a first service can submit an authentication request to the authentication system. The authentication request may be sent, for instance, in response to receipt of a customer request. The authentication request may include information that enables the authentication system to make a determination regarding the authenticity of certain information, such as an electronic signature. In response to the authentication request, the authentication system may provide an authentication response. If appropriate, the authentication system may provide in (or otherwise in connection with) the authentication response information that is usable by other services to determine whether to fulfill received requests.

In some embodiments, the authentication system provides in authentication responses a plurality of information instances. The plurality information instances may include a service-wide information that is applicable to multiple (perhaps all) services provided by a service provider (or, in some embodiments, multiple services of multiple service providers). The service-wide information may comprise various information such as a signing key, a copy of the signing key encrypted under a key accessible only to the authentication service and metadata in connection with an identity of the customer. The metadata may be electronically signed by the authentication service and usable by the first service to determine the identity and policy information associated with a second electronic signature provided with a request from the first service to the second service.

The plurality of information instances may also include one or more instances of service-specific information that are each usable only by a service (or set of services) to which the service-specific information applies. For a particular service, an instance of service-specific information may be an encrypted collection of information. The information, when decrypted, may enable a request signed with a signing key of the service-wide information to be verified. The collection of information may be encrypted using a key shared exclusively between the particular service and the authentication service. In this manner, a receiving service of an authentication response can forward a request signed using information from the service-wide information and service-specific information to another service (e.g., as part of a request to the other service) and the other service can use the service-specific information service-wide information to verify whether to perform one or more operations (e.g., in response to the request).

The service-wide information and service-specific information may be derived (e.g., cryptographically derived) utilizing techniques to ensure the security of access to computing resources. The various services may lack access to the secret information shared between the authentication service and the customer. Each service-specific information may be derived using, at least in part, information that is held secret between a corresponding service (or between each service of a set of services) corresponding to the service-specific information and the authentication service. The customer and other services may lack access to the secret information used to derive the service-specific information. In this manner, the authentication service is able to control access to various services without the need to communicate directly with those services.

FIG. 1 shows an illustrative example of environment 100 in which various embodiments may be practiced. In the environment 100 a customer 102 of service provider such as a competing resource service provider interacts with a system 104 requiring access to one or more services 106. The system 104 may be, for example, a computer system of the customer 102 or a system of the service provider that provides the services 106. Generally, as illustrated in FIG. 1, the customer 102 interacts with the system 104 in order to access the services 106. Interaction may be, for example, through appropriate user input and/or the transition of one or more electronic commands (e.g., local or remote web service calls) to the system 104 which may be, for example, application programming interface (API) calls to the system 104 to a web service interface of the system 104. In an embodiment the customer 102 is provided authority to access the services 106 and the authentication service 108 is configured to enable the customer 102 to prove authority to access the services 106, such as by providing appropriate credentials and/or other information generated using appropriate credentials.

In some embodiments, as illustrated in FIG. 1, the customer 102 may utilize the authentication service 108 to prove authority to access one or more of the services 106 through the system 104. As discussed in more detail below, the customer 102 may submit a request to, or otherwise interact with, the system 104. As a result, the system 104 may contact the authentication service 108.

Figure 2:
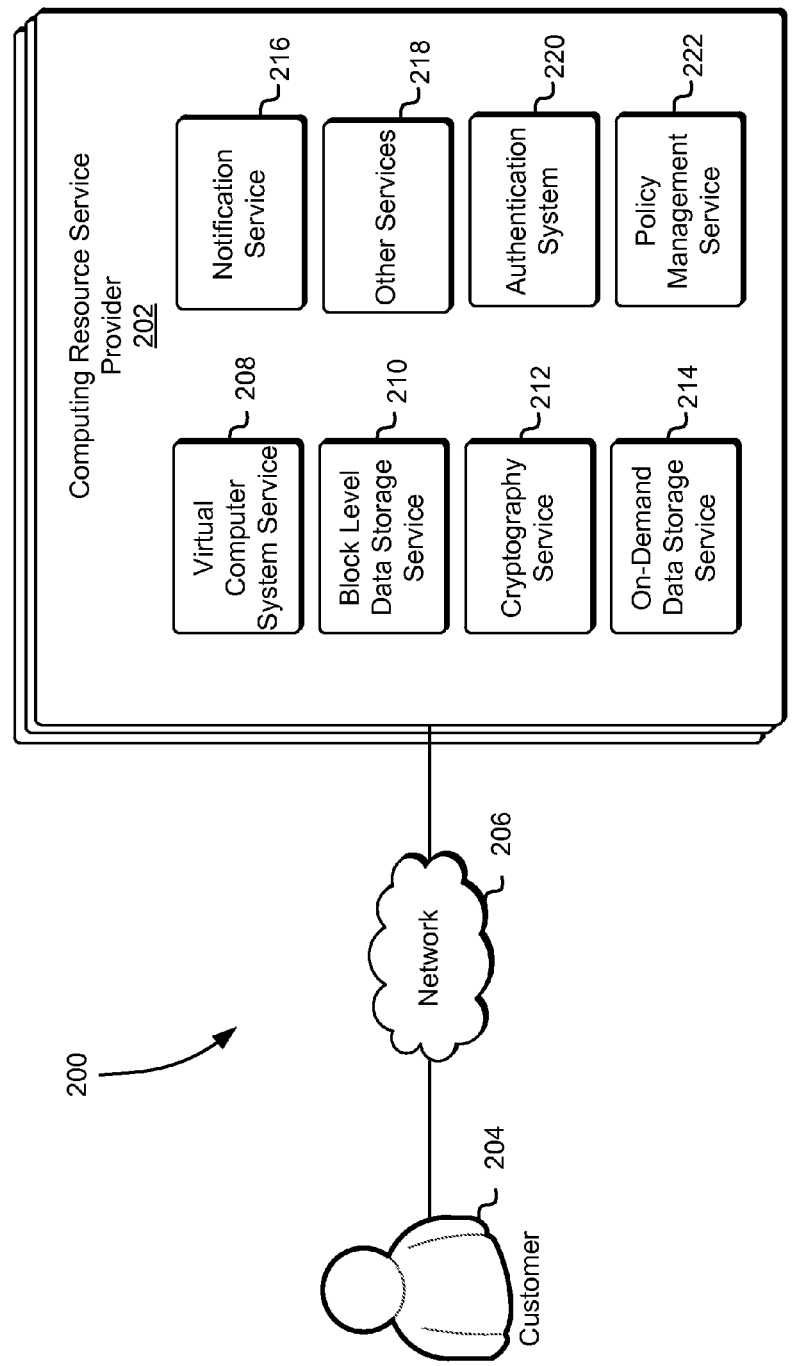
FIG. 2 shows an illustrative example of an environment in which various embodiments can be implemented.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to maintain and deliver information to its employees, which may be located in various geographical locations. Additionally, the customer 204 may be an individual that could utilize the various services to deliver content to a working group located remotely. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. The services provided by the computing resource service provider, in this example, include a virtual computer system service 208, a block-level data storage service 210, a cryptography service 212 (also referred to as a key management service), an on-demand data storage service 214 and one or more other services 216, although not all embodiments of the present disclosure will include all such services and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service and/or to access one or more block-level data storage devices provided by the block data storage service).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer.

Other applications for the virtual computer systems may be to support database applications, electronic commerce applications, business applications and/or other applications.

The block-level data storage service 210 may comprise a collection of computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

As illustrated in FIG. 2, the computing resource service provider 202 may operate a cryptography service, which is described in more detail below in connection with FIG. 3. Generally, the cryptography service may be a collection of computing resources collectively configured to manage and use cryptographic keys for customers of the computing resource service provider. Keys used by the cryptography service 212 may have associated identifiers that the customers can reference when submitting requests to perform cryptographic operations (such as encryption, decryption and message signing) and/or other operations, such as key rotation. The cryptography service may securely maintain the cryptographic keys to avoid access by unauthorized parties.

The computing resource service provider 202 may also include an on-demand data storage service. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects which may be used by the customer 204 to retrieve or perform other operations in connection with the data objects stored by the on-demand data storage service 214. The on-demand data storage service 214 may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

In the environment illustrated in FIG. 2, a notification service 216 is included. The notification service 216 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes such as monitoring applications executing in the virtual computer system service, workflow systems, time-sensitive information updates, mobile applications, and many others.

The computing resource service provider 202 may additionally maintain one or more other services 218 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As illustrated in FIG. 2, the computing resource service provider 202, in various embodiments, includes an authentication system 220 and a policy management service 222. The authentication system, in an embodiment, is a computer system (i.e., collection of computing resources) configured to perform operations involved in authentication of users of the customer. For instance, one of the services may provide information from the users to the authentication service to receive information in return that indicates whether or not the user requests are authentic. Determining whether user requests are authentic may be performed in any suitable manner and the manner in which authentication is performed may vary among the various embodiments. For example, in some embodiments, users electronically sign messages (i.e., computer systems operated by the users electronically sign messages) that are transmitted to a service. Electronic signatures may be generated using secret information (e.g., a private key of a key pair associated with a user) that is available to both an authenticating entity (e.g., user) and the authentication system. The request and signatures for the request may be provided to the authentication system which may, using the secret information, compute a reference signature for comparison with the received signature to determine whether the request is authentic.

If the request is authentic, the authentication service may provide information to the service that the service can use to determine whether to fulfill a pending request and/or to perform other actions, such as prove to other services, such as the cryptography service, that the request is authentic, thereby enabling the other services to operate accordingly. For example, the authentication service may provide a token that another service can analyze to verify the authenticity of the request. Electronic signatures and/or tokens may have validity that is limited in various ways. For example, electronic signatures and/or tokens may be valid for certain amounts of time. In one example, electronic signatures and/or tokens are generated based at least in part on a function (e.g., a Hash-based Message Authentication Code) that takes as input a timestamp, which is included with the electronic signatures and/or tokens for verification. An entity verifying a submitted electronic signature and/or token may check that a received timestamp is sufficiently current (e.g., within a predetermined amount of time from a current time) and generate a reference signature/token using for the received timestamp. If the timestamp used to generate the submitted electronic signature/token is not sufficiently current and/or the submitted signature/token and reference signature/token do not match, authentication may fail. In this manner, if an electronic signature is compromised, it would only be valid for a short amount of time, thereby limiting potential harm caused by the compromise. It should be noted that other ways of verifying authenticity are also considered as being within the scope of the present disclosure.

The policy management service 222, in an embodiment, is a computer system configured to manage policies on behalf of customers of the computing resource service provider. The policy management service 222 may include an interface that enables customers to submit requests related to the management of policy. Such requests may, for instance, be requests to add, delete, change or otherwise modify policy for the customer or for other administrative actions, such as providing an inventory of existing policies and the like. The policy management service 222 may also interface with other services to enable the services to determine whether the fulfillment of a pending request is allowable according to policy corresponding to the customer for which the request was made. For example, when a service receives a request, the service (if it has not locally cached such information) may transmit information about the request (and/or the request itself) to the policy management system which may analyze policies for the customer to determine whether existing policy of the customer allows fulfillment of the request and provide information to the service according to the determination.

Figure 3:
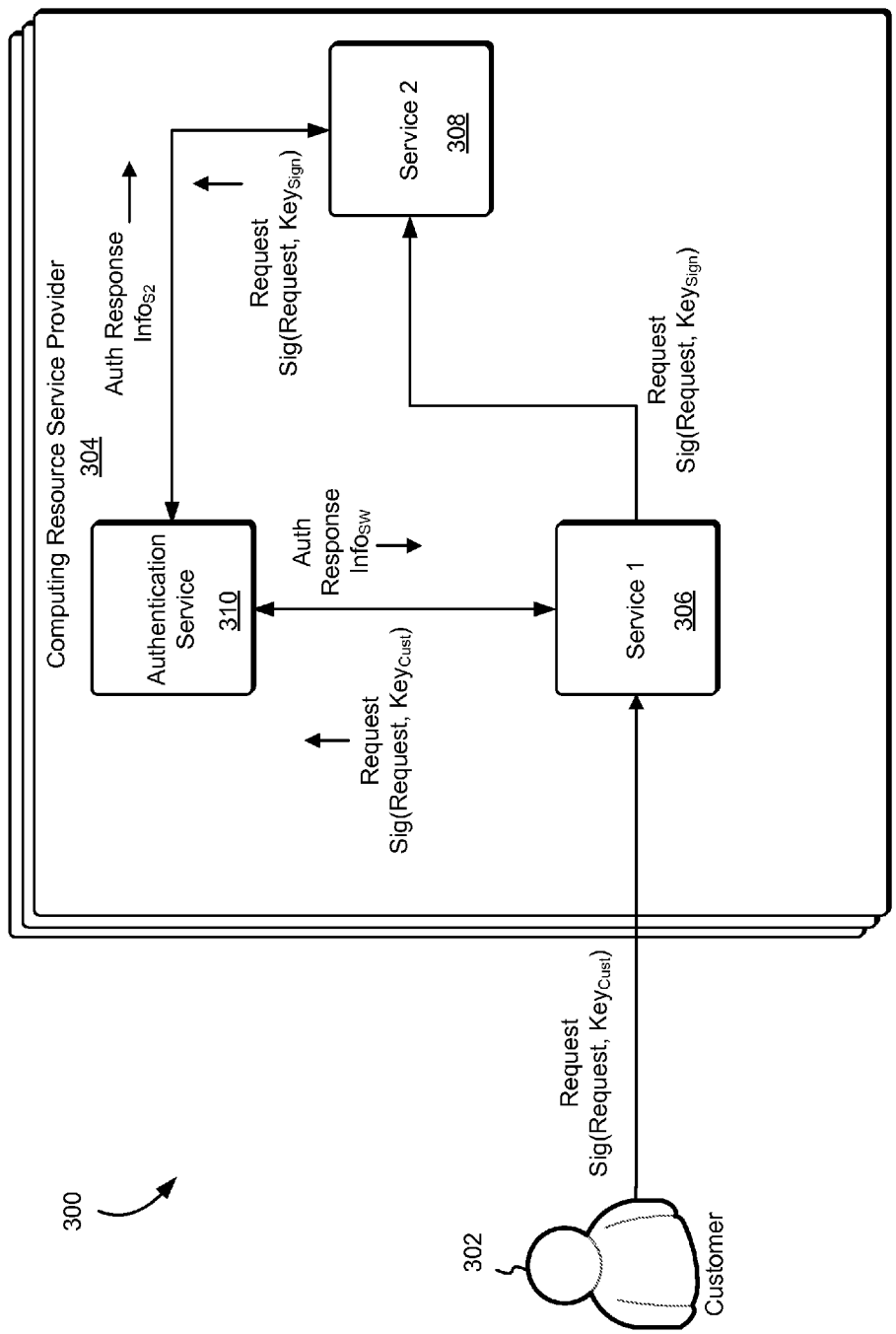
FIG. 3 shows an illustrative example of an environment in which various embodiments can be implemented and in which example information flow is illustrated.

FIG. 3 shows an illustrative example of an environment 300 in which various embodiments of the present disclosure may be practiced. As illustrated in FIG. 3 the environment 300 includes a customer 302 of a computing resource provider 304. The customer 302 may be a customer such as described above in connection with FIGS. 1-2. Similarly, the computing resource service provider 304 may be the service provider discussed above in connection with FIGS. 1-2. As illustrated by the cascading blocks representing the computer resource service provider 304, the computing resource service provider may provide services in different regions or in other ways which are logically separated. For instance, the computing resource service provider 304 may operate a virtual computer system service that spans multiple geographic regions. The computing resource service provider 304 may have one or more facilities, such as data centers, in each of the geographic regions in which it operates. The customer 302 may select regions for virtual computer systems provided by the computing resource service provider 304. In this manner, the customer 302 can utilize services of the computing resource service provider 304 in a manner that enables optimization of various aspects such as latency and/or to provide other advantages such as redundancy and failure protection. Customers 302 may also select which region(s) data is to be stored in. Generally, the customer 302 may select which regions computing resources are hosted in and the computing resource service provider 304 may host resources accordingly.

As discussed above, the computing resource service provider 304 may provide a service 306 which may utilize another service 308 as part of its operations. Access to the services 306, 308 may utilize an authentication service 310 such as discussed above. For example, the authentication service 310 may be a system configured with authority to determine whether access to the services 306, 308 is allowable in various instances, such as in response to requests received from the customer 302. As illustrated in FIG. 3, the customer 302 may submit a request to the first service 306.

The request from the customer 302 to the service 306 may include an electronic signature based at least in part on the request and a customer key indicated in the diagram of FIG. 3 as $Key_{Cust}$. The key, $Key_{Cust}$, may comprise secret information shared between the customer 302 and the authentication service 310. The key, $Key_{Cust}$, may, for instance, comprise a long term credential for the customer for use with the computing resource service provider 304. The customer 302 and authentication service 310 may restrict access to the customer key for the purpose of ensuring the integrity of data managed on behalf of the customer 302 and/or otherwise to provide security to the computing resources corresponding to the customer 302.

Upon receipt of the request and electronic signature, the service 306 may interact with the authentication service 310 to determine whether to fulfill the request from the customer 302. In an embodiment as illustrated in FIG. 3, the service 306 may provide the request and electronic signature to the authentication service 310. While not illustrated as such, additional information may be provided from the service 306 to the authentication service 310. For instance, information that enables the authentication service 310 to select the key, $Key_{Cust}$, from multiple keys accessible to the authentication service 310 and use $Key_{Cust}$ to verify the signature may be provided. In addition, an electronic signature of a request ("authentication request") to the authentication service from the service 306 may also be included to enable the authentication service 310 to determine whether the authentication request is authentic. The electronic signature from the service 306 may be generated using a key held in secret between the authentication service 306 and authentication service 310.

It should be noted that, while various embodiments of the present disclosure use symmetric cryptographic processes, where the sender and receiver utilize the same cryptographic key in a cryptographic process, the various techniques described herein may be modified to utilize one or more asymmetric cryptographic techniques (where the sender and receiver use different cryptographic keys in a cryptographic process, such as a public-private key pair in a public key cryptographic encryption, decryption or message signing algorithm). For instance, as noted above, various embodiments of the present disclosure utilize techniques wherein digital signatures are generated using symmetric keys shared secretly between entities (e.g., between a customer and an authentication or other service). The various techniques described above are adaptable to utilize digital signatures generated using secret information exclusively accessible to a particular entity (e.g., customer or service). A digital signature may be generated, for instance, using the Digital Signature Algorithm (DSA), the Elliptic Curve Digital Signature Algorithm (ECDSA), the RSA digital signature algorithm and/or authenticated encryption.

Returning to the embodiment illustrated in the figure, the authentication service 310 may be configured to determine the authenticity of the electronic signature provided from the customer, such as by using the customer key, $Key_{Cust}$, to generate a signature for the request to determine whether the generated signature matches the signature that was provided from the service 306. If the generated signature matches the signature that was provided from the service 306, the authentication service 310 may determine that the request from the customer 302 is authentic thereby enabling the service 306 to determine that the request should be fulfilled. In particular, as illustrated in FIG. 3, in some embodiments, the authentication service 310 provides an authentication response to the service 306 indicating a determination of the authentication service 310 whether the signature provided from the service 306 to the authentication service 310 is authentic.

The authentication response may include various information such as an attestation that the signature provided from the service 306 matches the customer 302, one or more policies associated with the customer 302 (to be enforced by the service 306 and/or other services 308). In an embodiment, the authentication service 310 also provides with the authentication response temporary credentials that the service 306 can use to make calls to the other services 308 related to the request submitted by the customer 302. In an embodiment, the temporary credentials (which may not be temporary in all embodiments) are provided in service-wide information indicated in the diagram as $Info_{SW}$. In an embodiment, the service-wide information is a key or generally information generated at least in part on the customer key or otherwise generated based at least in part on secret information shared between the customer 302 and the authentication service 310. In an embodiment, the service-wide information is different from the customer key and generally different from the secret information shared between the customer 302 and the authentication service 310 so as not to expose to other services the customer key or other secret information. In an embodiment, the service-wide information comprises various information such as a signing key (illustrated in the figure as $Key_{Sign}$), a copy of the signing key encrypted under a key accessible only to the authentication service and metadata in connection with an identity of the customer. The metadata may be electronically signed by the authentication service and usable by the first service to determine the identity and policy information associated with a second electronic signature provided with a request from the first service to the second service. The service-wide information may also include information encrypted (e.g., using an appropriate mode of the advanced encryption standard (AES)) under a key held secretly by the authentication service where the information includes an attestation to the identity of the customer 302, a timestamp, policy information, a signature of the attestation and/or timestamp and/or policy information.

In an embodiment, the service-wide information $Info_{SW}$ is usable by the service 306 to access one or more other services such as the second service 308. Accordingly, as illustrated in FIG. 3, the first service 306 may submit a request to the second service 308 with a digital signature generated using the signing key from the service-wide information. The second service 308 on receipt of the request may provide the request and digital signature (along with other information, such as an identity of the requestor and/or signing key) to the authentication service 310 (e.g., in an authentication request) in order to cause the authentication service 310 to make a determination whether the request from the first service 306 should be fulfilled. The authentication service 310 may use its secret key to decrypt the information encrypted in the service-wide information, verify the decrypted information and use the signing key in the encrypted information to verify the signature. If the signature is determined by the authentication service 310 to be valid, the authentication service 310 may generate service-specific information indicated in the diagram as $Info_{S2}$ which may be then provided to the second service 308 with an authentication response, such as described above. It should be noted that the authentication response provided from the authentication service 310 to the service 308 may be the same as or different from the authentication response received by the service 306. For instance, the authentication response received by the second service 308 may include the same type of information as the authentication response received by the service 306, but specific to the service 308. In some embodiments, the type(s) of information included in an authentication response received by each service may vary by service.

The service-specific information may include, encrypted under a key shared between the second service 308 and the authentication service 310, the signing key, $Key_{Sign}$, or a derivation thereof. Generally, the service-specific information may include a key (whether the signing key or a derivation thereof) that the second service can use to verify a signature from the first service. An example way a derivation of the signing key can be include in the service-specific information, $Info_{S2}$, is as follows:

$$E_{KEYS2AS}(f(f(f(Key_{Sign}, \text{"date"}), \text{"region"}), \text{"service"})),$$
where where "date," "region" and "service" are parameters corresponding respectively to limitations on the date, region, and service in which the key $Key_{Sign}$ is usable, where f is any suitable function, and $E_{KEYS2AS}$ is an encryption function (e.g., application of an appropriate mode of AES) that uses a key shared secretly between the second service 308 and the authentication service 310, and where $f(f(f(Key_{Sign}, \text{"date"}), \text{"region"}), \text{"service"})$ is an argument along with the request to a digital signature algorithm that will produce a reference digital signature that matches the received signature if the received signature is valid. (In other words, the first service may have generated the digital signature by using $f(f(f(Key_{Sign}, \text{"date"}), \text{"region"}), \text{"service"})$ as a key into a digital signature algorithm.) In some embodiments, f represents a hash-based message authentication code (HMAC) generated based on the arguments to the function. In some embodiments, the second service decrypts the service-specific information to obtain $Key_{Sign}$, uses $Key_{Sign}$ to generate $f(f(f(Key_{Sign}, \text{"date"}), \text{"region"}), \text{"service"})$, and uses $f(f(f(Key_{Sign}, \text{"date"}), \text{"region"}), \text{"service"})$ to verify the signature from the first service. In other embodiments, decrypting the service-specific information results in $f(f(f(Key_{Sign}, \text{"date"}), \text{"region"}), \text{"service"})$, which is then used to verify the signature from the first service. In yet other embodiments, the decrypted service-specific information results in a partial derivation (e.g., $f(f(Key_{Sign}, \text{"date"}), \text{"region"}))$ which the second service finishes (e.g., to obtain $f(f(f(Key_{Sign}, \text{"date"}), \text{"region"}), \text{"service"}))$ for use in verifying a signature from the first service. It should be noted that, a derivation of a signing key can also be referred to as a signing key, such as when the derivation is used to generate a digital signature.

It should be noted that the order in which the parameters are input into the iterative use of the function f and the way the parameters are encoded may be based on a canonical system utilized throughout the services of the computing resource service provider 304. In other words, when a service verifies a received service-specific information, the service will generate a reference key using the same canonical system (e.g., by encoding the date in the same way and inputting the date in the same order). In this manner, the service will only be able to positively verify the service-specific information it received if it uses the same parameters and the same secret key shared with the authentication service. Thus, for instance, in this illustrative example, if the service-specific information is provided on a different date than when generated, the service receiving the service-specific information will be unable to verify the service-specific information and, as a result, will not determine to perform one or more operations on the sole basis of having received the service-specific information (although other information, such as a subsequent communication from the authentication service 310 may be usable to determine to perform one or more operations despite having received an invalid service-specific information). It should further be noted that the particular parameters of date, region, and service are provided for the sake of illustration and different sets of parameters may be used. For example, generally limitation on key use may be used as a parameter. Further, while the above illustrates a specific calculation that utilizes iterative invocations of the same function, different functions may be used. For instance, the output of one function may be used as an input to another function. Further, a single function may take as input all parameters. Other variations are considered as being within the scope of the present disclosure.

In some embodiments, the service-specific information for a service includes metadata that is electronically signed by the authentication service so that the electronic signature of the metadata is verifiable by the service, thereby enabling the service to determine the authenticity of the metadata. For instance, the metadata may be electronically signed using a secret key shared exclusively between the service and the authentication service. For example, the metadata may include identity information, origination information, and/or policy information associated with the service-specific information. The identity information may specify an identity of the customer that submitted the request to the first system. The identity information may enable a service to access resources associated with the identity and to perform other operations, such as generate one or more bills for the customer. The origination information may specify an identity of an originator of a request to the second service (e.g., an identity of the first service). The policy information may encode one or more policies applicable to the customer (and/or specific identity of a user associated of the customer), where the policies are obtained from a data store by the authentication service and provided for enforcement by the first service, second service and/or other service. Thus, the authentication service may provide information that indicates the signature from the customer is valid, but another service may nevertheless deny a request due to fulfillment of the request being disallowed by policy provided from the authentication service. The metadata may be structured such that the service receiving the metadata is able to verify that a request from another service that includes the metadata (as part of the service-specific information) is from and/or for one or more identities (e.g., service and/or customer) matching the metadata and that fulfillment of the request is in accordance with any policy encoded in the metadata. The metadata data may be part of the information of the service-specific information that is encrypted and decryptable by the service, or may be provided separately, such as in a token provided outside of the encrypted data.

In this manner, the second service 308 can use its own version of the secret information to determine whether requests from the first service 306 made on behalf of the customer 302 are authentic. For example, as noted above, the second service 308 may, upon receipt of the of a digitally signed request from the first service 306, use its own copy of secret information to decrypt the service-specific information and use the decrypted service-specific information to determine if the digital signature received from the authentication service 310 is authentic. For instance, if the second service generates a reference signature that matches the digital signature from the first service, a request may be fulfilled and, conversely, if there is not a match, the request may be denied (or otherwise verified). In addition, when the second service receives service-specific information (either from the authentication service or, as described below, from the first service or a customer computer system), the second service may insert some or all of the service-specific information or information derived therefrom into a cache that that second service can use for future requests from the first service. When another request is received, the second service may check the cache before processing (e.g., decrypting) service-specific information received with the request. In other words, the second service may process service-specific information received in a request in the event of a cache miss.

As noted, numerous variations are considered as being within the scope of the present disclosure. For example, the environment 300 is simplified for the sake of illustration of certain concepts. Other environments within the scope of the present disclosure include those that are different than what is illustrated. For example, in some embodiments, services maintain a cache of responses from the authentication service 310. Before communicating with the authentication service, the service may check its cache to determine whether a determination whether to fulfill a request can be made without contacting the authorization service. The second service 308 may, for instance, cache the service-specific information and/or information contained therein so that at least some future requests from the first request on behalf of the customer can be verified without contacting the authentication service. In addition, various information is shown as being transmitted from one component to the other. Such information may vary according to the various embodiments. As just one example of an alternative, information passed from one component to the other may be different from but based at least in part on the information discussed and illustrated in the figures. Additional layers of encryption may be used as may additional electronic signatures to enable various components to verify the authenticity of communications. Further, the variations discussed above in connection with FIG. 3 are applicable to other environments, such as those discussed below. Conversely, variations discussed below are likewise applicable to the environment 300 discussed above in connection with FIG. 3.

Figure 4:
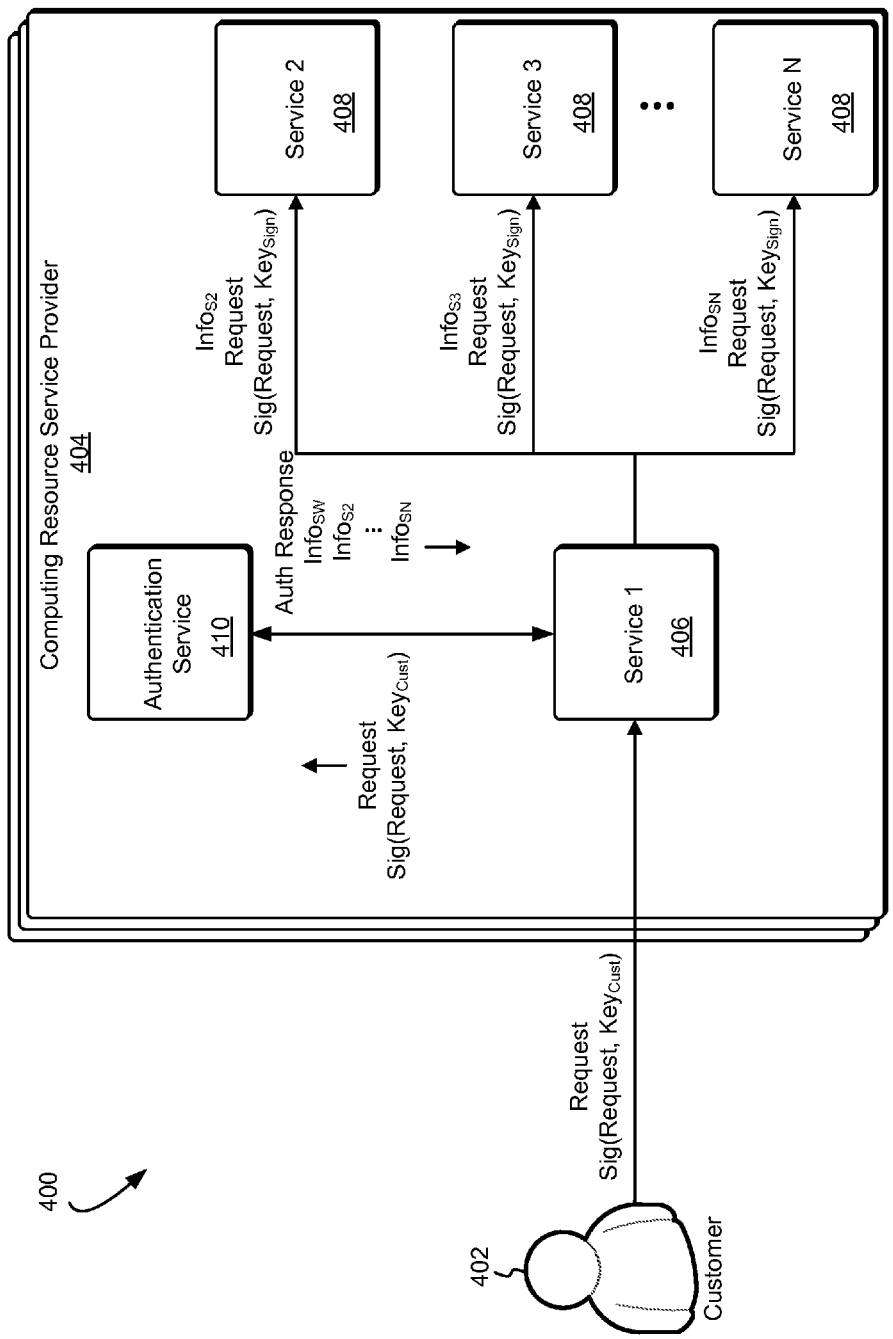
FIG. 4 shows an illustrative example of an environment in which various embodiments can be implemented and in which example information flow is illustrated.

FIG. 4 shows an illustrative example of an environment 400 which may be used to implement various aspects of the disclosure. The environment 400 may include components such as described above in connection with FIG. 3. For example, in FIG. 4 the environment 400 includes a customer 402 of a computing resource service provider 404. The computing resource service provider may host a plurality of services such as a first service 406 and one or more other services 408. An authentication service 410 may be configured within the environment 400 with authority to manage access control with respect to the various services of the computing resource service provider 404. In an embodiment, the first service 406 is configured to utilize one or more other services 408 in its operations. The first service 406 may, for example, be a service that is used by the customer 402 to manage computing resources managed by the other services 408. The first service 406 may, for instance, be configured to utilize templates for networks that are implementable using one or more services of the computing resource service provider 404, thereby providing customers the ability to set up networks for various purposes with less technical knowledge and/or less effort than would otherwise be required.

In an embodiment, the environment 400 and in particular the computing resource service provider 404 is configured such that the first service 406 is able to access the one or more other services 408 without the other services 408 requiring communication with the authentication service 410. In other words, the computing resource service provider 404 may operate such that information from the first service 406 is sufficient for authentication of requests, but determinations on authentication is ultimately controlled by the authentication service 410. For instance, referring to FIG. 3, instead of a single request from the customer 402 causing the authentication service 410 to communicate with two separate services, a single request from the customer 402 may result in utilization of multiple services with only one service communicating with the authentication service 410. In this manner, load on the authentication service 410 is reduced, better latency with the authentication service 410 is attained, network resources are freed up and other advantages are achieved.

As illustrated in FIG. 4, such may be accomplished through the passage of appropriately configured information. For example, as illustrated in FIG. 4, the customer 402 may submit a request and an electronic signature for the request to the first service 406. The electronic signature may be signed using a customer key, such as described above in connection with FIG. 3. Upon receipt of the request in the electronic signature for the request the first service 406 may provide the request and the electronic signature to the authentication service 410. As discussed above, in connection with FIG. 3 the authentication service 410 may provide, in response to the request from the first service 406, an authentication response and service-wide information such as described above. In addition, however, to the authentication response and the service-wide information the authentication service 410 may provide one or more instances of service-specific information, which in the figure are identified by $Info_{S2}$ through $Info_{SN}$. Also, the authentication service may include, for the one or more services 408, corresponding service-specific authentication responses. A service-specific authentication response may be a response that a corresponding service 408 would receive from the authentication service 410 if the service 408 were to submit the service-wide information to the authentication service 410 itself, such as described in FIG. 4. The service-specific authentication response may include information specific to the corresponding service 408, such as described above. For instance, the service-specific authentication response may include policy associated with the customer 402 and applicable to the corresponding service 408, an attestation to the identity of the customer 402, and an electronic signature generated based at least in part on a secret key shared between the corresponding service 408 and the authentication service 410 (but lacked by other services), where the electronic signature is usable by the corresponding service 408 to verify the authenticity of information provided in the service-specific authentication response. As discussed above, the service-specific information may include a signing key that is included in the service-wide information and/or a derivation thereof. Further, the service-specific information may be encrypted such that a corresponding service (e.g., the second service in FIG. 4) can decrypt the service-specific information, but such that other, non-corresponding services cannot decrypt the service-specific information. For instance, the some or all of the service-specific information may be encrypted using a secret key shared exclusively between the corresponding service and the authentication service.

In other words, the first service 406 receives information that another service 408 would have received in response to a communication with the authentication service to determine whether or not to perform one or more operations. In addition, the service-specific information may be provided to the first service in the form of an authentication response that another service (e.g., in the figure, Service 2 through Service N) would have received had the other service contacted the authentication service itself. In this manner, the first service 406 may digitally sign requests to other services using a signing key provided in the service-wide information and provide, with the requests and signatures, appropriate service-specific information to another service utilized in fulfilling a request from the customer 402. For example, the service-specific information, $Info_{S2}$, may correspond to a second service 408 labeled in the figure as Service 2. The first service may provide the request, a signature of the request using a signing key from the service-wide information and the service-specific information, $Info_{S2}$, to the second service 408. In this manner, the second service 408 may utilize the its own secret key shared with the authentication service 410 to decrypt the service-specific information, obtain a signing key or derivation thereof from the decrypted service-specific information, and use the signing key (or derivation thereof) to determine whether the generated key matches the provided service-specific information, $Info_{S2}$. In other words, the second service 408 is able to utilize the information provided from the first service 406 in order to determine whether or not to perform one or more operations in response to a communication from the first service 406. The second service 408 therefore does not need to communicate with the authentication service 410 to determine whether to fulfill the request from the first service. However, the second service is able to determine whether to perform one or more operations under authority of the authentication service 401 because of the use of secret information shared with the authentication service 410. In addition, the information usable by the second service 408 to determine whether to perform one or more operations is information that the first service is unable to utilize or access due to having been generated using secret information that is shared by the authentication service 410 and the second service 408, but that which the first service 406 lacks. Further, since the service-specific information received from the second service 408 from the first service 406 is in the form of an authentication response that the second service 408 would have received had it contacted the authentication itself to verify the signature, the second service 408 is able to cache some or all of the service-specific information or information derived therefrom and utilize a cache for future requests from the first service.

As with all environments illustrated herein, variations are considered as being with the scope of present disclosure. For example, as illustrated in FIGS. 3 and 4, a first service communicates with an authentication service in response to a request received from a customer of a computing resource service provider. It should be noted that the scope of the present disclosure extends to embodiments where a synchronous request from the customer 402 does not necessarily precede the transfer of information as illustrated in FIGS. 3 and 4 and variations thereof. As one illustrative example, referring to FIG. 4, the first service 406 may be an auto-scaling service that measures various activity in connection with computing resources managed by the computing resource service provider and performs scaling operations in response thereto. As one example, if a customer utilizes the computing resource service provider to operate a website, the auto-scaling service may add or subtract web servers supporting the website as appropriate. Such auto-scaling operations may be performed without a synchronous customer request present. That is, the operations may be performed in response to one or more triggers that do not include a pending request from the customer, although the customer may have submitted a request asynchronously (e.g., to set up auto-scaling) prior to any auto-scaling operations.

As an example of another variation as considered within the scope of the present disclosure, FIG. 4 illustrates service-wide information and service-specific information being provided to each of the other services 408. Additional information may be included as well. For example, each of the services 408 may be provided the service-specific information for each of the services 408 (or s subset thereof). Each of the services 408 may share secret information with the authentication service that the other services 408 and the service 406 lack. In this manner, the first service 406 may provide to each service both information that is usable by that service to determine whether to perform one or more operations and other information that is not usable by that service (because it cannot be decrypted, e.g.). In this manner, this first service is not required to determine which service gets which information and the services 408 can each make such determinations on their own.

Figure 5:
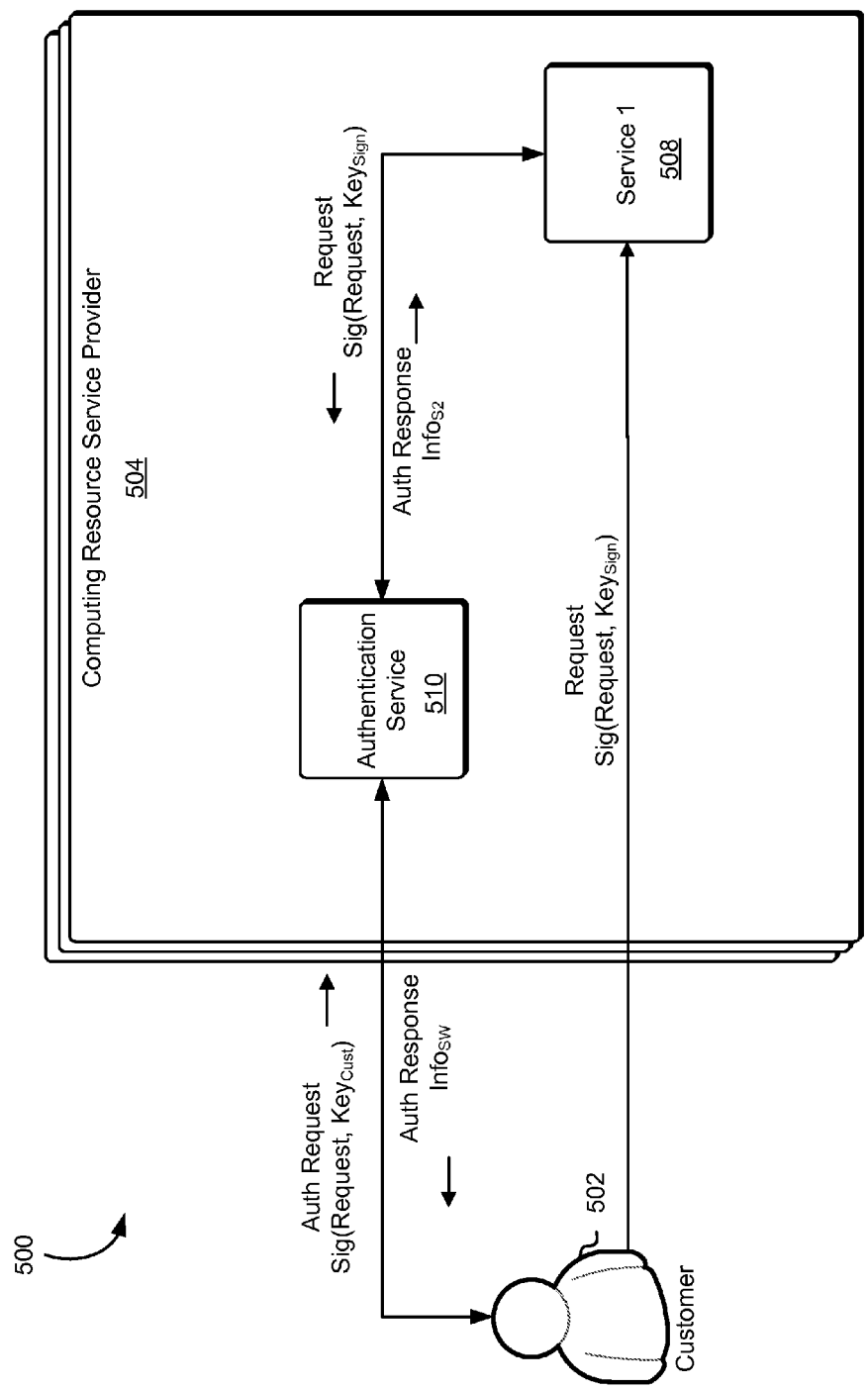
FIG. 5 shows an illustrative example of an environment in which various embodiments can be implemented and in which example information flow is illustrated.

Other variations are also considered as being within the scope of the present disclosure. For example, as noted above, certain operations illustrated in FIGS. 3 and 4 as being performed at the computing resource service provider 404 may be performed client-side such as on a computers system of a customer of the computer resource service provider. FIG. 5 accordingly shows an illustrative example of an environment 500 in which various embodiments may be practiced. As illustrated in FIG. 5, the environment 500 may include components such as those described above. For instance, as illustrated in FIG. 5, the environment 500 includes a customer 502 of a computing resource service provider such as described above. The computing resource service provider may include one or more services 508 and an authentication service 510. Instead of from a service of the computing resource service provider 504, the customer 502, that is a computer system of the customer 502, may submit an authentication request with a corresponding electronic signature to the authentication service 510 of the computing resource service provider 504. The authentication service 510 may verify the electronic signature provided from the customer 502 and may provide an authentication response that, if the electronic signature is valid, includes service-wide information, such as described above.

The customer 502 then may submit a request to the service 508 using a signing key (or derivation thereof) from the service-wide information, such as described above. The service 508 may then provide the request and digital signature to the authentication service 510 which may provide an authentication response and service-specific information to the service 508 in response. The service 508 may fulfill or deny the request according to the authentication response. As discussed, the service 508 may cache information (the service-specific information and/or information obtained therefrom) to be used for future requests to avoid at least some communications with the authentication service. The service 508 may, for instance, may decrypt the service-specific information using a key to which the service 508 has access, obtain the signing key (or derivation thereof) from the decrypted service-specific information and use the signing key (or derivation thereof) from the service-specific information to verify one or more future requests from the customer 502 without a need to contact the authentication service.

Figure 6:
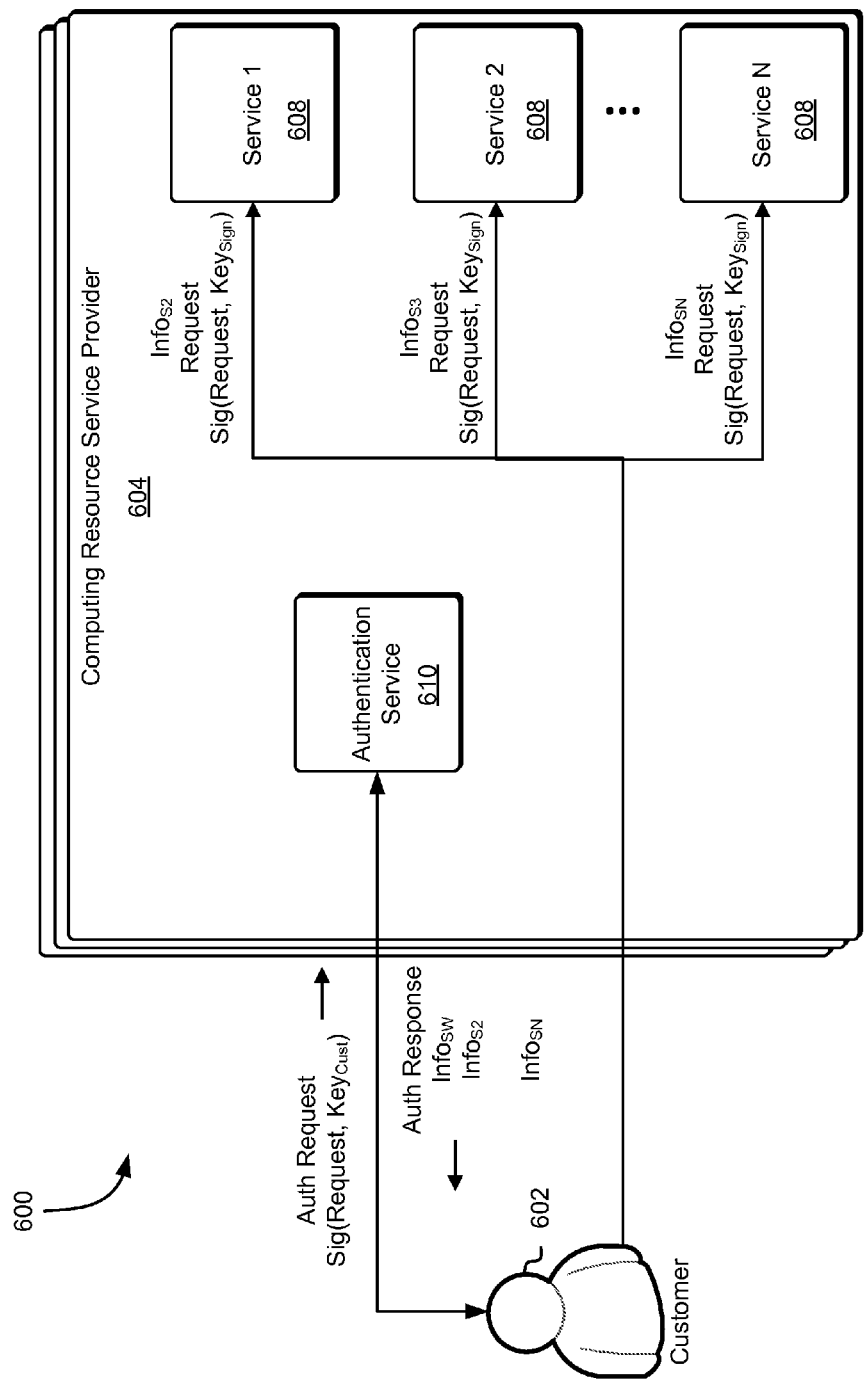
FIG. 6 shows an illustrative example of an environment in which various embodiments can be implemented and in which example information flow is illustrated.

In embodiments where various operations are performed client-side, such as illustrated in FIG. 5, the various techniques described herein may be utilized to allow services to determine whether to perform operations without a need to communicate with an authentication service. FIG. 6, accordingly, shows an illustrative example of an environment 600 which may be used to implement various embodiments of the present disclosure. The environment 600 may include various components such as described above, including a customer 602 of a computing resource service provider 604. The computing resource service provider may include one or more services 608, the access to which is ultimately controlled by an authentication service 610. As illustrated in FIG. 6, a customer may submit an authentication request directly to the authentication service 610 allowing with an electronic signature which may be verified by the authentication service 610. Upon a positive verification, the authentication service 610 may provide to the customer 602 an authentication response that includes a service-wide information and service-specific information for one or more services, such as described above. The customer 602 may then use a signing key (or derivation thereof) from the service-wide information to sign a request to another service 608 which is transmitted to the other service 608 with the service-specific information. Each of the services 608 may use a secret shared between the service 608 and the authentication service 610 but that is lacked by the customer 602 and the other services 608 to decrypt corresponding service-specific information to obtain a signing key (or derivation thereof) from the service-specific information. The signing key (or derivation thereof) may be used to and determine whether the request from the customer 602 is authentic without contacting the authentication service. In this manner, each of the services 608 are able to independently verify without communication with the authentication service 610 whether to perform one or more operations in response to a communication from the customer 602.

Figure 7:
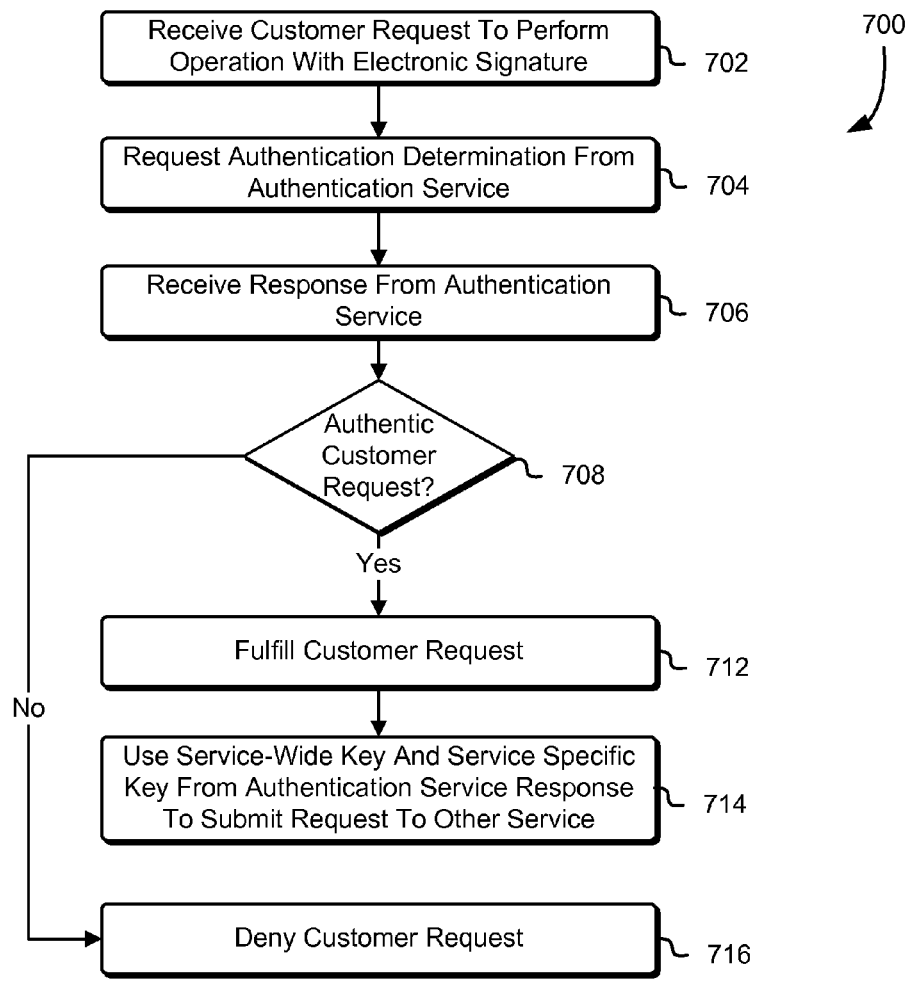
FIG. 7 shows an illustrative example of a process for managing access in accordance with at least one embodiment.

FIG. 7 shows an illustrative example of a process 700 for managing access to computing resources in accordance with an embodiment. The process 700 may be performed by any suitable system such as by the service 306 described above in connection with FIG. 3, the service 406 described above in connection with FIG. 4 and/or by a customer system such as described above in connection with FIGS. 5 and 6. In an embodiment, the process 700 includes receiving 702 a customer request to perform one or more operations with an electronic signature. In other words, the process 700 includes receiving 702 a customer request and an electronic signature with the request. Receipt 702 of the request and electronic signature may be performed over a network, such as the Internet. The request and signature may be provided, for instance, in a web service call to a system performing the process 700. In some embodiments, such as embodiments where a customer system receives 702 the request, the request may be received internally, such as over an internal network or internally within a computing device.

Upon receipt 702 of the customer request and electronic signature, the process 700 may include requesting 704 an authentication determination from an authentication service such as described above. As discussed above, requesting 704 an authentication determination may be performed by submitting an authentication request to an authentication system. Accordingly, a response from the authentication service may be received 706 in response to the request 704 for the authentication determination. The response from the authentication service may be analyzed and a determination may be made 708 whether the customer request is authentic. For instance, the response may be an authentication response, such as discussed above, that includes an attestation to the identity provided as a result of a positive authentication determination. If it is determined 708 that the customer request is authentic, that is that the authentication response from the authentication service allows the customer request to be fulfilled, the process 700 may include fulfilling 712 the customer request. The manner in which the request may be fulfilled 712 may vary in accordance with the various embodiments and in accordance with the type of request was submitted.

The process 700 may also include using 714 a service-wide information and a service-specific information from the authentication service response to submit one or more requests to one or more other services, such as described above. For instance, the process 700 may include using a signing key from service-wide information received from the authentication service to sign a request to another. The request to the other service may be provided to the other service with service-specific information for the other service. Other information, such as an authentication response may also be provided to the one or more other services. The authentication response may be an authentication response that the one or more services would have received themselves had the one or more services provided the service-wide information to the authentication service themselves for an authentication determination from the authentication service. It should be noted that, while FIG. 7 illustrates fulfilling 712 the customer request and using 714 the service-wide information and the service-specific information to submit one or more requests to one or more other services as separate operations, fulfillment 712 of the customer request may include use of the service-wide information and service-specific information to submit one or more requests to one or more other services. Other variations, including repeating operations of the process 700 to submit requests to additional services, are also considered as being within the scope of present disclosure such as described above and below.

Returning to process illustrated in FIG. 7, if it is determined 708 that the customer request is not authentic, then the customer request may then be denied 716. Denial of the customer request may be performed in any suitable manner, such as by providing that the request is denied, providing one or more reasons why the request was denied, or by not taking any action and/or generally in any suitable manner. As noted, variations of process 700 and all processes described herein are considered as being within the scope of the present disclosure. For example, additional operations may be included in the process 700. In some embodiments, for instance, services may cache responses from an authentication service. Accordingly, the process 700 may include checking a cache to determine whether information usable to determine authenticity of the customer request has been cached. An authentication request to the authentication service may occur when such information is not found in the cache. Other variations are also considered as being within the scope of the present disclosure.

Figure 8:
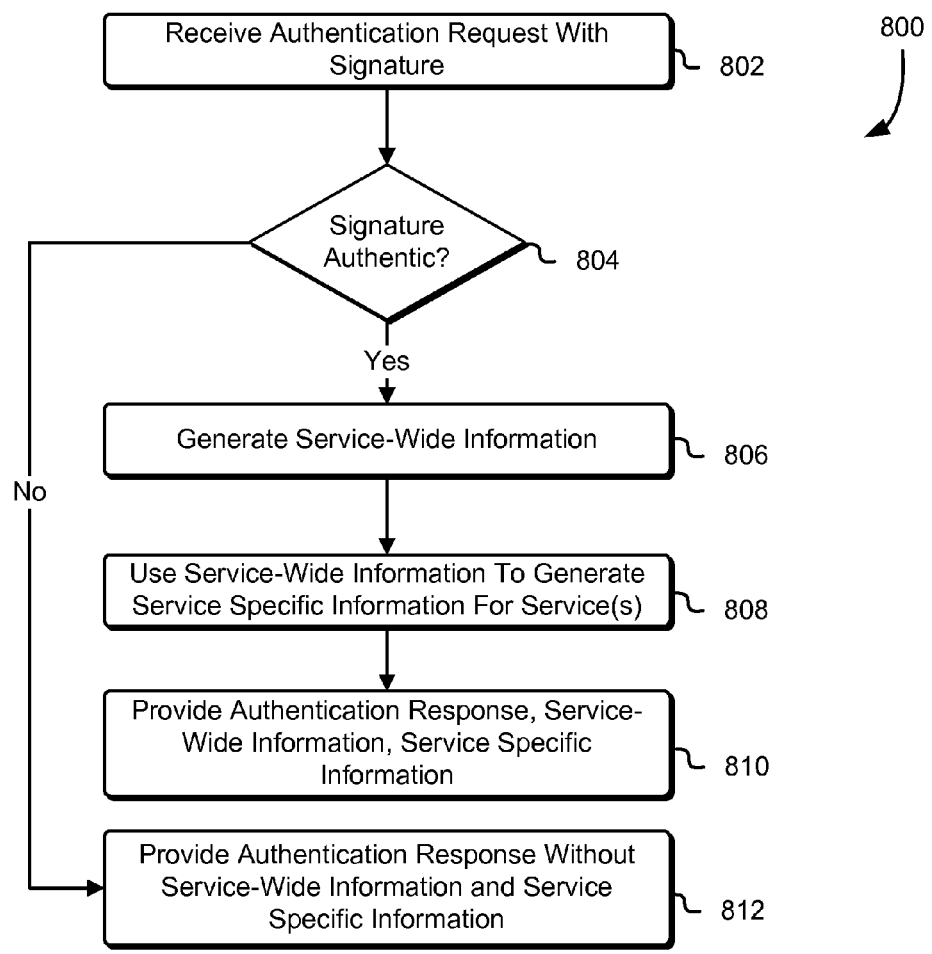
FIG. 8 shows an illustrative example of a process for managing access in accordance with at least one embodiment.

FIG. 8 shows an illustrative example of a process 800 which may be performed to manage access to various competing resources in accordance with various embodiments. The process 800 may be performed by any suitable system such as by an authentication service described above. As illustrated in FIG. 8, the process 800 includes receiving 802 an authentication request with an electronic signature of the request. As discussed above, the electronic signature may have been generated using a secret shared between a customer and the system performing the process 800, although, as noted, asymmetric cryptographic techniques are also considered as being within the scope of the present disclosure. The request and signature of the request may be received by a service that received the request and signature from a customer, such as described above. Upon receipt 802 of the authentication request with the signature, the signature may be verified and a determination may be made 804 whether the signature is authentic. If it is determined 804 that the signature is authentic, the process 800 may include generating 806 a service-wide information. The service-wide information may be generated 806 to include information such as described above. Further, as illustrated in FIG. 8, the process 800 may include using 808 the generated service-wide information to generate service-specific information for one or more other services, such as described above. The generated service-wide information and generated service-specific information may be provided 810 in or otherwise in connection with an authentication response. Other information, such as service specific authentication responses, as discussed above, may also be provided.

If, however, it is determined 804 that the signature is not authentic, the process 800 may include providing 812 an authentication response without the service-wide information and without the service-specific information. An authentication response may, for example, indicate a failure to verify the electronic signature. In this manner, the service-wide information and service-specific information are only provided when the signature that was received 802 is authentic.

As with all processes discussed herein, variations are considered as being within the scope of the present disclosure. For example, FIG. 8 shows generation of a service-wide information and one or more service-specific information upon determining 804 that the signature that was received 802 is authentic. It should be noted, however, that in some embodiments, the order of operations performed may vary. For example, the service-wide information and/or one or more service-specific information may be generated before receipt 802 of the request and/or determination 804 whether the signature is authentic. A system performing the process 800 or a variation thereof may, for instance, pre-generate service-wide information and/or service-specific information and store the service-wide information and service-specific information in a cache that is accessed upon a determination that a signature provided in an authentication request is authentic.

As another example, as noted above, a system performing the process 800 may selectively provide service-specific information for a selected proper subset of services configured with the ability to use service-specific information to authenticate signatures from other services. Accordingly, in some embodiments, the process 800 and variations thereof include selecting which service-specific information to generate and/or provide. Selection may be made in various ways in accordance with the various embodiments. For example, in some embodiments, the authentication request may indicate which service specific information to provide. A customer request may, for instance, be fulfillable using a subset (e.g., proper or other subset) of services of a service provider. As an example, some types of requests may have associated subsets of services. As a result of receiving the customer request, an authentication request may be submitted that specifies the services of the proper subset (or, generally, any subset). The system performing the process 800 may generate and/or provide service specific information that has been specified. As noted in more detail below, selection of what service-specific information to provide may be performed in various ways, such as by analyzing past customer behavior to determine which services are likely to be needed. As one illustrative example, a database used by the system performing the process 800 may maintain an association between the customer and a set of services the customer utilizes (e.g., has resources in). Other additional operations that may be performed by a system performing the process 800 include performing other operations, such as policy evaluation, in determining the authentication response. Other variations are also considered to be within the scope of the present disclosure.

Figure 9:
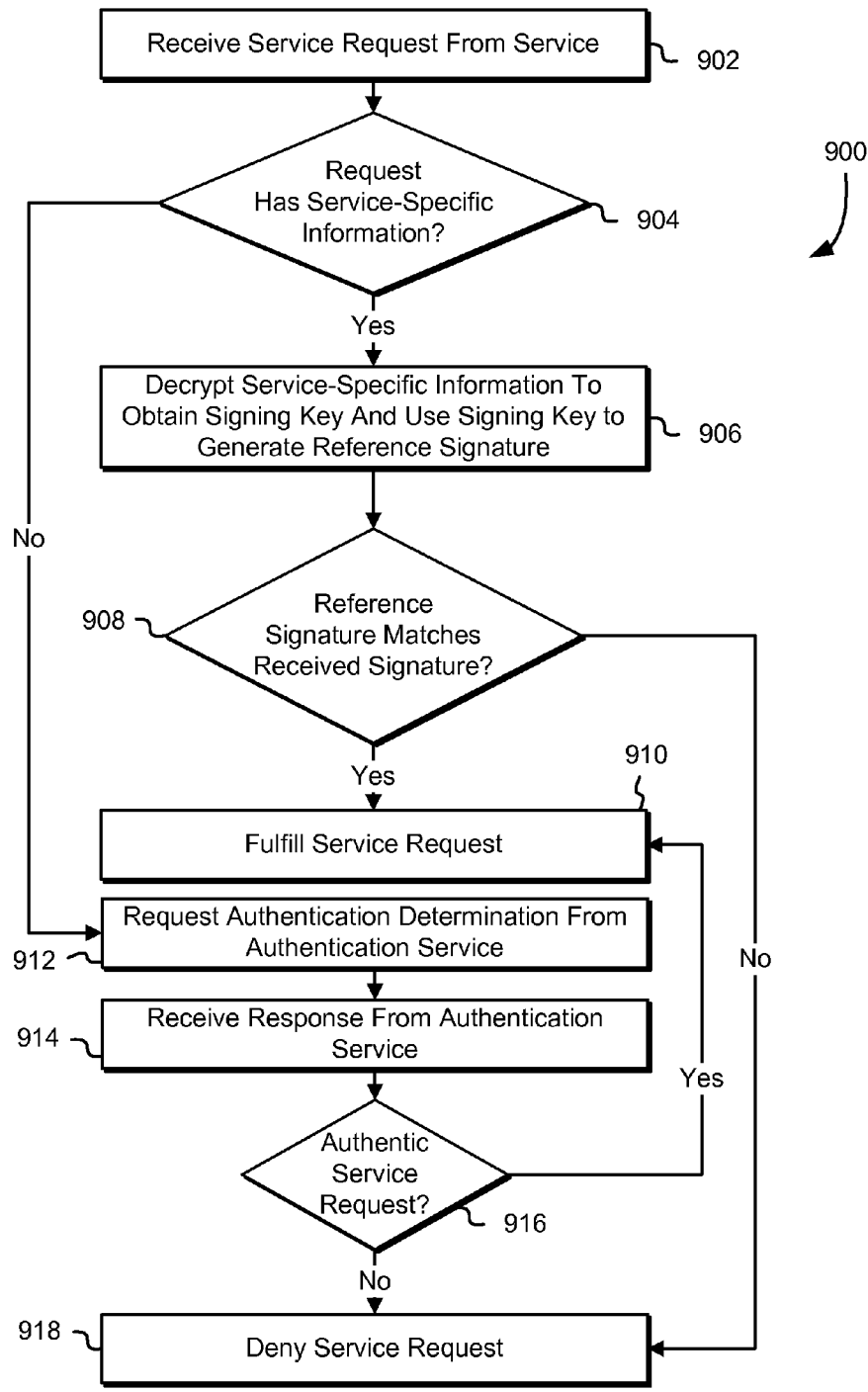
FIG. 9 shows an illustrative example of a process for managing access in accordance with at least one embodiment.

FIG. 9 shows an illustrative example of a process 900 for managing access to computing resources in accordance with an embodiment. The process 900 may be performed by any suitable system such as by a service 308 described above in connection with FIG. 3, a service 408 described above in connection with FIG. 4, a service 508 described above in connection with FIG. 5, and a service 608 described above in connection with FIG. 6. In an embodiment, the process 900 includes receiving 902 a service request from a service. A service request may be a request that is submitted from another service to perform one or more operations or, in some embodiments, form a customer system or another system operating on behalf of the customer. For example, referring to FIG. 4, the service request may be a request received from the service 406 to one of the services 408 that is performing the process 900. Upon receipt 902 of the service request from the service, the process 900 may include determining 904 whether the request is provided with service-specific information.

If it is determined 904 that the service request is provided with service-specific information, the process 900 may include using 906 the and a secret key to decrypt the service-specific information, obtain a signing key from the service-specific information, and generating a reference signature of the request using the obtained signing key. As noted, a derivation of the signing key, such as described above, may be obtained and used to generate the reference signature. A determination may then be made 908 whether the generated reference signature matches the received signature. If it is determined 908 that the reference signature matches the received signature, the process 900 may include fulfilling 910 the service request. Fulfillment of the service request may include the performance of one or more operations and/or providing a response to the service request. If, however, it is determined 904 that the request is not provided with service-specific information, the process 900 may include requesting 912 an authentication determination from an authentication service such as described above. A response from the authentication service may then be received 914 and a determination may then be made 916 whether the service request is authentic, such as described above. If, however, it is determined 908 that the generated reference signature does not match the received signature or if it is otherwise determined 916 that the service request is not authentic, the process 900 may include denying 918 the service request such as described above.

It should be noted that variations are considered as being within the scope for the present disclosure. For example, the process 900 may include operations in addition to those illustrated in the Figure. As an example, as noted above, a service request may include one or service-specific information for one or more other services where some of the service-specific information is inapplicable to the service for which the process 900 is being performed. The process 900 may therefore include selecting appropriate service-specific information from the information that was received with the service request. The request may, for example, include information that is useable to identify which key to select and/or the information may be organized in a canonical manner that enables selection of the appropriate service-specific information. As another example, the process 900 illustrates denying 918 the service request upon a determination 908 that the generated reference signature does not match the received signature. As a variation, the process 900 may include requesting 912 an authentication determination from the authentication service if it is determined 908 that the reference signature does not match the received signature. It may be, for example, that the received service-specific information is expired and communication with the authentication service is thereby required. In other words, it may be that despite the invalidity of the received signature the request may nevertheless be fulfillable upon a determination that the request is fulfillable from the authentication service.

As yet another example, as noted above, a service request may, in addition to a service-specific information, include an authentication response that may include various information, such as policy applicable to the customer and/or the system providing the service request. For instance, as noted, service-specific information may authenticate metadata and determine whether the metadata is sufficient for fulfilling the request. For instance, a service receiving the service-specific information in connection with a request may check whether the identity of the requestor matches an identity in the metadata and whether fulfilling the request would be in accordance with any policy encoded in the metadata. Accordingly, the process 900 may include using this information (e.g., evaluating policy) according to the manner in which a system performing the process 900 is programmed to use the information.

Other variations are also considered as being within the scope of the present disclosure. For example, as noted above, an authentication service may provide, in response to an authentication request, service-specific information for each service of a set of services. In various embodiments, the authentication service may selectively provide service-specific information instead of, for instance, providing service-specific information for all services for which service-specific information is providable. It may be, for example, that a system is configured to provide responses of a particular length and therefore only a certain number of instances of service-specific information are providable. Accordingly, various embodiments of the present disclosure allow for intelligent selection of service-specific information in order to optimize system performance and reduce the amount of information transferred across a network.

Figure 10:
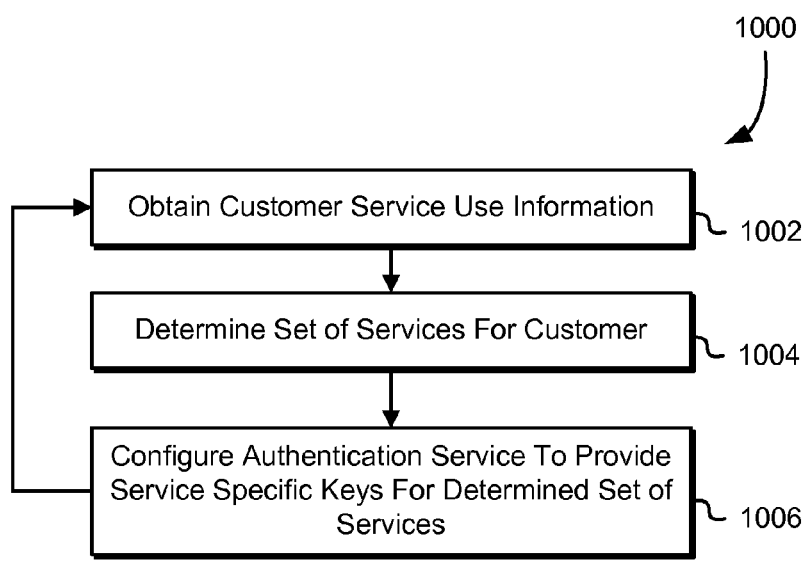
FIG. 10 shows an illustrative example of a process for updating an authentication service in accordance with at least one embodiment.

FIG. 10 accordingly shows an illustrative example of a process 1000 which may be used to manage which one or more instances of service-specific information are provided in response to an authentication request. The process 1000 may be performed by any suitable system such as by an authentication service or by another system. For example, a management system (not pictured) of a computing resource service provider may perform the process 1000 as may a background process in an authentication service. In an embodiment of the process 1000 includes obtaining 1002 customer service-use information. Customer service-use information may be configured in various ways in accordance with various embodiments. In some instances, for example, the customer service-use information indicates which services of a computer service resource provider the customer actually utilizes. For example, referring to FIG. 2, a computing resource service provider may provide numerous services in connection with computing resources and a customer may utilize a proper subset of those services that is a set of services that is less than all services offered by the computing resource service provider. The services may be prioritized in accordance with frequency of use, measurements of resources used in each service, amounts spent utilizing the various services, and/or in other ways. Prioritization may allow for selecting the services of highest priority for providing service specific information, such as described above. As another example of customer service-use information, customer service-use information may be information that the customer explicitly provides. For example, a customer may specify, such as through an appropriately-configured API call and/or interaction with a management console webpage provided by the service provider, one or more services for which service-specific information an authentication service is to provide.

As yet another example, customer service-use information may indicate services that the customer is likely to use. As one example, some services may frequently be used by customers together, where frequency may be measured across multiple (e.g., all) customers. As one example, customers of a virtual computer system service may use a lock level beta storage service more often than other services. Accordingly, the service use information may include such services that are frequently used together. Generally, this customer service use information may include any information which prioritizes or otherwise indicates which service-specific information should be provided by an authentication service. Accordingly, the process 1000 includes determining 1004 a set of services for the customer based, at least in part, on the customer service-use information. An authentication service may then be configured 1006 to provide service-specific information for each of the determined set of services. Configuring 1006 the authentication service may be performed, for instance, by updating a database used by the authentication service to select which service specific information to provide and/or by updating programming logic of the authentication service to cause the authentication service to operate in accordance with the determined set of services for the customer.

Figure 11:
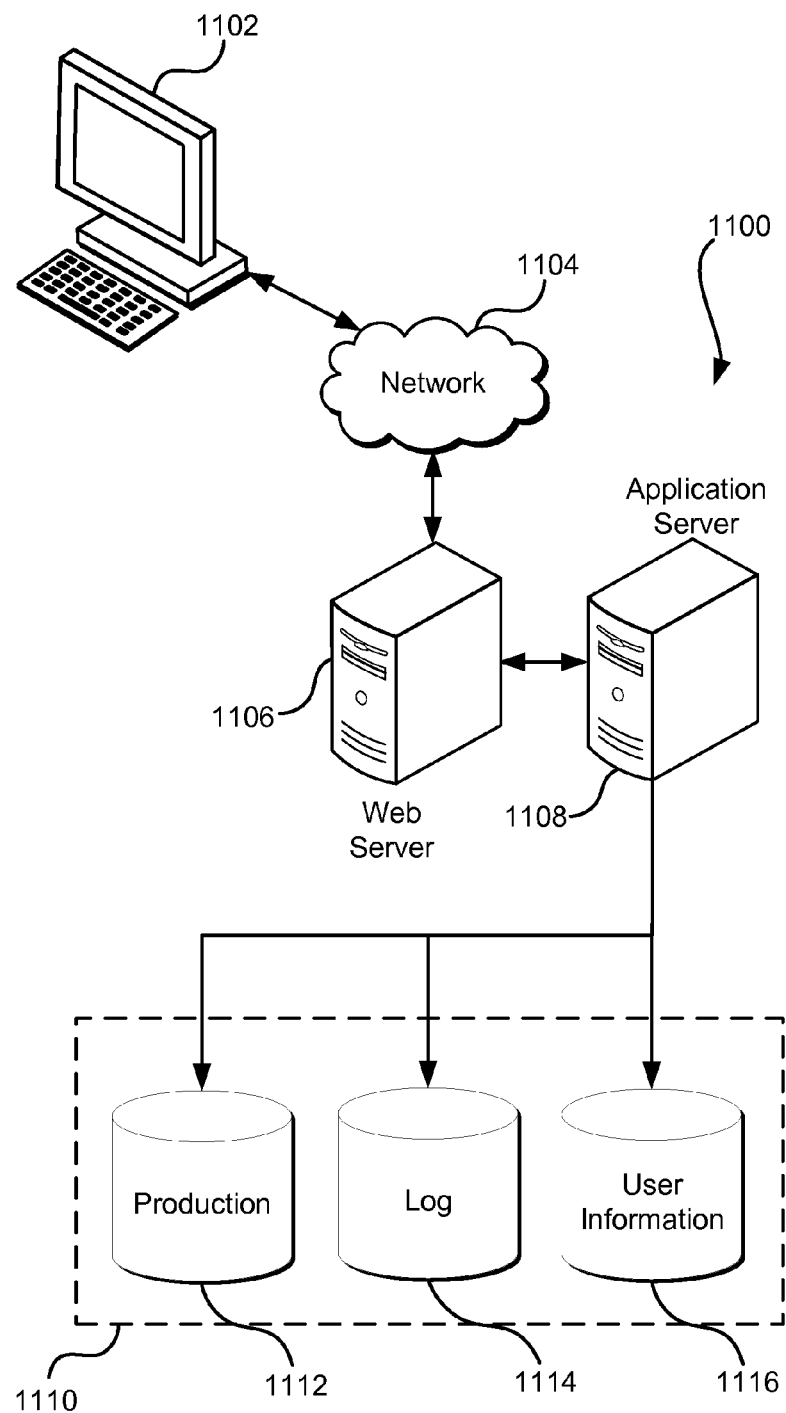
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1110 can include several separate data tables, databases or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation, those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing access to a first service of a service provider, comprising:
under the control of one or more computer systems configured with executable instructions,
receiving a request, originated from a requestor, to perform one or more operations, the request including authentication information and derived information, the derived information derived by an authentication service based at least in part on secret information lacked by the requestor, the derived information including identity information that specifies an identity, policy information specifying one or more policies associated with the identity, and origination information identifying the requestor;
determining, without communicating with the authentication service, based at least in part on the secret information, the authentication information, and the derived information, whether to fulfill the request; and
causing the request to be fulfilled as a result of determining to fulfill the request.

2. The computer-implemented method of claim 1, wherein determining whether to fulfill the request includes:
checking a cache for information usable to determine whether to fulfill the request; and
using the derived information to determine whether to fulfill the request as a result of the cache lacking the information usable to determine whether to fulfill the request.

3. The computer-implemented method of claim 1, wherein the requestor is a second service of the service provider.

4. The computer-implemented method of claim 1, further comprising:
receiving a second request;
requesting, from the authentication service, a response indicating whether to determine whether to fulfill the second request; and
causing the second request to be fulfilled when the response indicates to fulfill the second request.

5. The computer-implemented method of claim 1, wherein:
the derived information is further derived based at least in part on one or more first parameters each corresponding to a limitation on use of a signing key;
determining whether to fulfill the request includes:
performing an algorithm to generate reference information based at least in part on the signing key and one or more second parameters; and
determining whether the reference information matches the authentication information; and
the algorithm is configured to result in the reference information matching the authentication information when the one or more first parameters match the one or more second parameters.

6. The computer-implemented method of claim 1, wherein the method further comprises selecting the derived information from a plurality of instances of information each corresponding to a different service of the service provider.

7. The computer-implemented method of claim 1, wherein the requestor is managed by an entity different from the service provider.

8. The computer-implemented method of claim 1, wherein the first service lacks access to the secret information.

9. A system, comprising:
one or more processors; and
memory including instructions executable by the one or more processors that cause the system to at least:
receive a request, originated from a requestor, to perform one or more operations, the request including authentication information and derived information, the derived information derived by an authentication system based at least in part on secret information lacked by the requestor, the derived information including identity information that specifies an identity, policy information specifying one or more policies associated with the identity, and origination information identifying the requestor;
determine, without communicating with the authentication system, based at least in part on the secret information, and the authentication information, and the derived information, whether to fulfill the request; and
cause the request to be fulfilled as a result of determining to fulfill the request.

10. The system of claim 9, wherein:
the derived information is encrypted under a key accessible to both the system and the authentication system but inaccessible to the requestor; and
determining whether to fulfill the request is made based at least in part on the derived information and one or more cryptographic processes, wherein the one or more cryptographic processes include:
using the key to decrypt the derived information to obtain a signing key; and
using the signing key to verify the request.

11. The system of claim 9, wherein:
the derived information is further derived based at least in part on one or more first parameters each corresponding to a limitation on use of a signing key;
the instructions that cause the system to determine whether to fulfill the request include instructions that cause the system to:
perform an algorithm to generate reference information based at least in part on the signing key and one or more second parameters; and
determine whether the reference information matches the authentication information; and
the algorithm is configured to result in the reference information matching the authentication information when the one or more first parameters match the one or more second parameters.

12. The system of claim 9, wherein:
the requestor is an entity hosted by a first service of a service provider;
the system is hosted by a second service of the service provider;
the service provider provides a third service;
the secret information is first secret information;
the derived information is derived based at least in part on a signing key and second secret information shared between the authentication system and the third service; and
the derived information is usable by the third service to verify requests from the first service that are electronically signed using the signing key.

13. The system of claim 9, wherein:
the derived information includes metadata comprising:
identity information;
policy information; and
an electronic signature of the metadata; and
the instructions that cause the system to determine whether to fulfill the request include instructions that cause the system to:
authenticate the metadata; and
determine whether the request is compliant with the identity information and the policy information.

14. The system of claim 9, wherein:
the requestor is an entity hosted by a first service of a service provider;
the system is hosted by a second service of the service provider; and
the first service is configured to manage, on behalf of a customer of the service provider, one or more computing resources hosted by one or more other services that include the second service.

15. The system of claim 9, wherein:
the derived information is decryptable using the secret information; and
the instructions that cause the system to determine whether to fulfill request include instructions that cause the system to:

use the secret information to decrypt the derived information to yield decrypted information;
obtain a signing key from the decrypted information; and
use the signing key to determine whether the origination information is valid.

16. The system of claim 9, wherein the derived information includes:
an electronic signature; and
encrypted information that, when decrypted, includes a signing key usable to verify the electronic signature without contacting the authentication system.

17. The system of claim 9, wherein the instructions that cause the system to determine whether to fulfill the request include instructions that cause the system to cryptographically verify the derived information using, in one or more cryptographic processes, the secret information shared by the system and the authentication system.

18. The system of claim 9, wherein the derived information is configured to cause the one or more processors to make a negative determination whether to fulfill the request from the requestor unless the derived information is provided to the system in accordance with one or more key use limitations used to generate the derived information.

19. The system of claim 9, wherein the request includes an electronic signature originating from an entity different from the requestor and is a request for access to one or more computing resources managed by the system on behalf of the entity.

20. The system of claim 9, wherein:
a service provider provides a set of systems that includes the system;
the derived information derived by an authentication system is further based at least in part on the authentication system selecting a proper subset of the set of systems; and
whether to fulfill the request is, at least in part, determinable as a result of whether the system is in the proper subset.

21. The system of claim 9, wherein:
the one or more processors are first one or more processors;
the memory is first memory;
the instructions are first instructions; and
the system further comprises:
second one or more processors; and
second memory including second instructions executable by the second one or more processors that cause the system to at least:
receive from the authentication system:
an indication that a pending customer request is authentic;
a signing key; and
the derived information, the derived information derived based at least in part on the signing key and the secret information, the second one or more processors lacking access to the secret information; and
provide, to the first one or more processors, the request including the derived information.

22. A computer-readable storage medium having stored thereon instructions that, when executed by one or more processors of a computer system, cause the computer system to:
receive a request, originated from a requestor, to perform one or more operations, the request including authentication information and derived information, the derived information derived by an authentication system based at least in part on secret information lacked by the requestor, the derived information including identity information that specifies an identity, policy information specifying one or more policies associated with the identity, and origination information identifying the requestor;
determine, without communicating with the authentication system, based at least in part on the secret information, the authentication information, and the derived information, whether to fulfill the request; and
cause the request to be fulfilled as a result of determining to fulfill the request.

23. The computer-readable storage medium of claim 22, wherein:
the requestor is hosted by a first service;
the computing system is hosted by a second service; and
the authentication system and the second service are services provided by the same service provider.

24. The computer-readable storage medium of claim 22, wherein:
the derived information is second information;
the second information comprises, in encrypted form, first information transmitted by a first service of a service provider to the authentication system; and
the authentication information is an electronic signature generated based at least in part on a signing key provided to the authentication system by the first service.

* * * * *